(12) United States Patent
Mol et al.

(10) Patent No.: US 6,872,354 B1
(45) Date of Patent: Mar. 29, 2005

(54) PARISON AND BLOW MOLDING METHOD FOR BOTTLE HAVING UNDERCUT

(75) Inventors: Phillip John Mol, Pomona, NJ (US); Andrew Howes, Norwich (GB)

(73) Assignee: Wheaton USA, Inc., Millville, NJ (US)

( * ) Notice: Subject to any disclaimer, the term of this patent is extended or adjusted under 35 U.S.C. 154(b) by 140 days.

(21) Appl. No.: 10/297,905

(22) PCT Filed: Oct. 19, 2000

(86) PCT No.: PCT/US00/41282

§ 371 (c)(1),
(2), (4) Date: Dec. 9, 2002

(87) PCT Pub. No.: WO02/32651

PCT Pub. Date: Apr. 25, 2002

(51) Int. Cl.[7] .......................... B29C 49/06; B29C 49/54; B29D 22/00
(52) U.S. Cl. .................... 264/537; 428/35.7; 428/542.8
(58) Field of Search ................................ 264/537, 523; 428/35.7, 542.8

(56) References Cited

U.S. PATENT DOCUMENTS 4,054,629 A    10/1977   Wang et al.
5,346,665 A    9/1994    Watanabe et al.

OTHER PUBLICATIONS

PCT International Search Report of International Application No. PCT/US00/41282.

*Primary Examiner*—Suzanne E. McDowell
(74) *Attorney, Agent, or Firm*—RatnerPrestia (57) ABSTRACT

A parison (110) for a container having a substantially constant wall thickness, the container having a base, a top edge defining a round opening, the top edge defining a plane which is not parallel to the plane of the base, a neck portion disposed at the same angle as the plane defined by the top edge, a front outer surface, and a rear outer surface having a lower portion and an upper portion. The parison comprises a cylindrical upper neck portion (140) having a cavity extending therethrough, the upper nock having a top surface (145) edge defining a top plane. The parison also has a hollow, elongated body portion (150) having a closed lower end (155) and an upper end (160), the lower body portion having a major axis extending in a direction parallel to the longitudinal axis of the cylindrical upper neck portion, and having a front wall (170) and a rear wall (175). The front wall is thicker than said rear wall. Also included in the invention is a method of producing a bottle (100) from the parison.

15 Claims, 13 Drawing Sheets

SECTION: A-A

FIG. 11A

SECTION: B-B

FIG. 11B

SECTION: A-A

FIG. 12A

SECTION: B-B

FIG. 12B

PARISON AND BLOW MOLDING METHOD FOR BOTTLE HAVING UNDERCUT

FIELD OF INVENTION

The invention relates to blow molding, and more specifically to a method for blow molding a bottle with an undercut shape and a parison used in the blow molding of a bottle with an undercut shape.

BACKGROUND OF THE INVENTION

It is known to produce plastic (or resin-based) bottles by injection blow molding. Injection blow molding comprises the steps of first producing an intermediate resin article having a shape similar to that of the final resin article. This intermediate resin article is often referred to as the parison, or preform. The parison is usually formed by an injection molding process whereby molten resin is forced into a cavity defined by the space between a moveable core rod and the parison mold into which the core rod is placed. Once the injection molding part is complete, the thus-formed parison is transferred from the parison mold to the blow mold via the moveable core rod on which it rests.

The parison is next transferred, via the core rod, to the blow mold. The longitudinal axis of the core rod is generally parallel to the plane of separation of the blow mold halves. The blow mold cavity has the shape of the outside of the final bottle product. The parison is then inflated, often through the introduction of air through the core rod, and caused to expand to the shape of the blow mold. Typically, because the parison wall is effectively stretched during the blowing process, the final product wall thickness is less than the wall thickness of the parison.

The blow mold is typically comprised of two halves, each of which moves in a substantially opposite direction with respect to the other. The contact area where the two mold halves meet and later part (after the blowing is complete) is usually called the parting line. The parting line is usually substantially parallel to the longitudinal axis of the core rod. Where special product shapes are desired, however, it is sometimes necessary to have a parting line that is not linear or completely parallel to the core rod axis.

Where special bottle shapes are desired, and thus the parting line is not linear, it becomes important to insure that the core rod can be both transferred into the location between the open blow mold halves and removed from the same position with the blown bottle in place on the core rod. Because of conventional machinery, it is equally important is that the blown bottle be able to be stripped from the core rod in a direction parallel to the longitudinal axis of the core rod.

Because the blown bottle must be stripped from the core rod in a direction parallel to the axis of the core rod, it can be difficult to blow mold bottles having an undercut shape. This is especially true where it is important that the product bottle have a consistent wall thickness throughout. Where consistent wall thickness is desired, it is preferred that the parison be positioned in (or as close as possible to) the geometric center of the blow mold cavity. Where the parison is not in the middle of the blow mold cavity, the distance that the molten plastic comprising the parison must travel when blown is greater in some parts of the mold than in others. This incongruity in the distance stretched results in a bottle having varying wall thickness in its different regions.

SUMMARY OF INVENTION

The present invention provides both a method and a device for the blow mold production of a bottle having an undercut surface and an off-center vertical axis. The method involves the blow molding of a container having a substantially constant wall thickness, but having an oblong base, a round top edge defining a round opening, the round top edge defining a plane which is not parallel to the plane of the base, a neck portion disposed at the same angle as the plane defined by the top edge, a front outer surface, and a rear outer surface having a lower portion and an upper portion. The method comprises the steps of forming a parison having a cylindrical upper neck portion having a cavity extending therethrough, the upper neck having a top surface edge defining a top plane. The parison has a hollow, elongated lower body portion having a closed lower end and an upper end, the lower body portion having a major axis extending in a direction parallel to the longitudinal axis of the cylindrical upper neck portion. The parison also has a front wall and a rear wall, the closed lower end defining a plane which is parallel to the top plane defined by the top surface edge. Below the top is a transition region connecting the upper neck portion and the lower body portion, the transition region having a top end with the same cross section as the cylindrical upper neck portion and a lower end with the same cross section as the upper end of the lower body portion. Important in this method is the fact that the front wall is thicker than the rear wall. After the parison is made according to these characteristics, it is blow molded in a blow mold to form the final product shape.

The invention also comprises the parison itself. The parison of the invention has a first wall a first distance from the blow mold inner surface and a second wall a second distance from the inner surface. The first distance is less than the second distance and the first wall is thinner than the second wall. The parison comprises a cylindrical upper neck portion having a cavity extending therethrough, the upper neck having a top surface edge defining a top plane. The parison also has a hollow, elongated lower body portion having a closed lower end and an upper end, the lower body portion having a major axis extending in a direction parallel to the longitudinal axis of the cylindrical upper neck portion. The lower body portion has a front wall and a rear wall and a closed lower end defining a plane which is parallel to the top plane defined by the top surface edge. The parison also has a transition region connecting the upper neck portion and the lower body portion, the transition region having a top end with the same cross section as the cylindrical upper neck portion and a lower end with the same cross section as the upper end of the lower body portion. The transition region has a sloped wall extending from the rear wall of the lower body portion out and up from the rear wall of the lower body portion to the upper neck portion. The front wall is thicker than the rear wall. This parison produces a bottle having a parting line mark on its sides, as opposed to its front or rear walls, which is generally more aesthetically pleasing.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not necessarily to scale. On the contrary, the dimensions of the various features are arbitrarily expanded or reduced for clarity. Included in the drawing are the following figures.

DETAILED DESCRIPTION OF INVENTION

Figure 1:
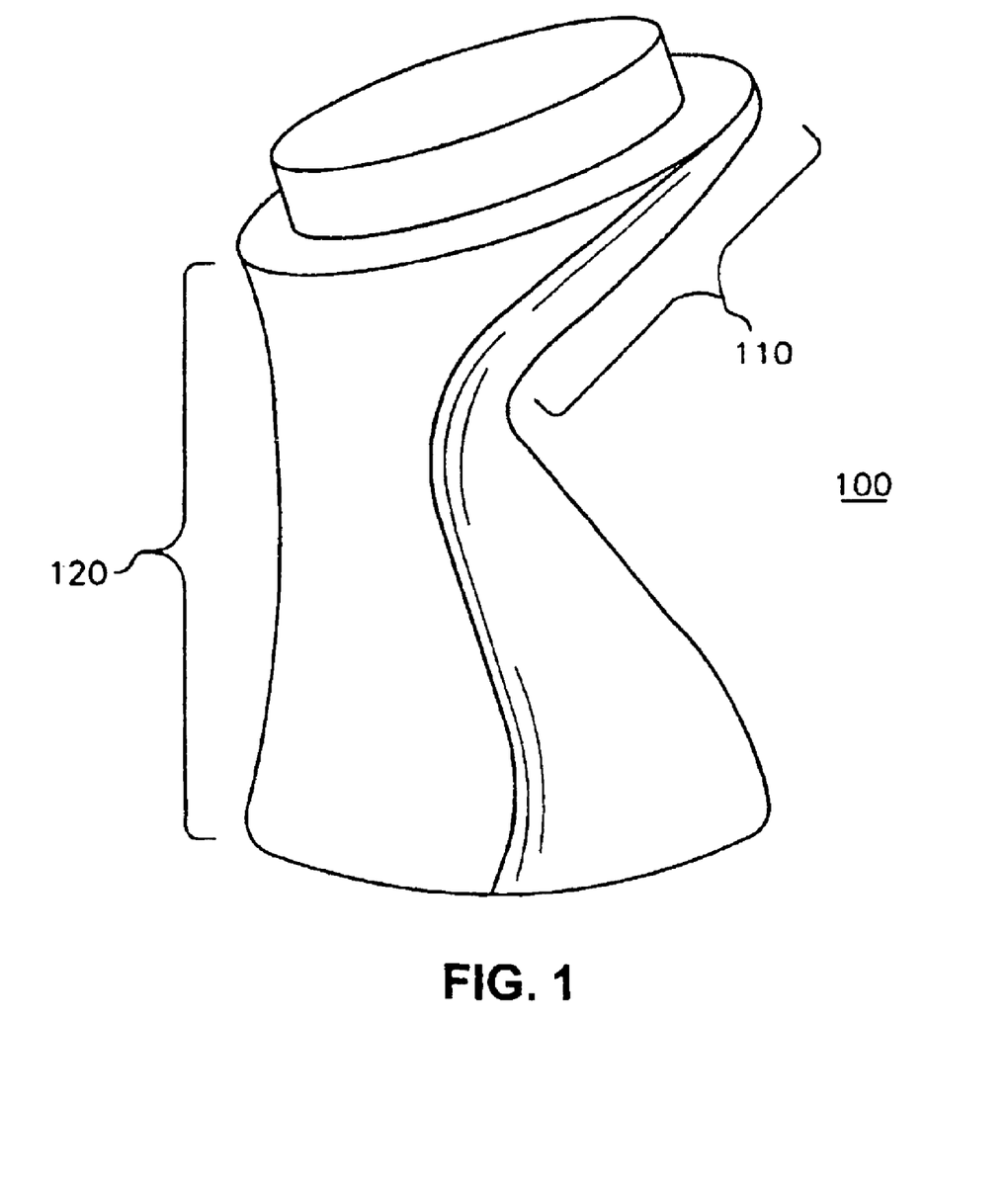
FIG. 1 is a schematic view of a bottle blow molded in accordance with the present invention.

The present invention relates to the production of a bottle having an off-center vertical axis. FIG. 1 shows one example of the type of bottle 100 having an undercut region 110 which can be produced through a blow molding process according to the present invention. Before the present invention, this type of bottle was typically made through an extrusion molding process because its shape presented several problems to conventional blow-molding techniques.

Figure 2:
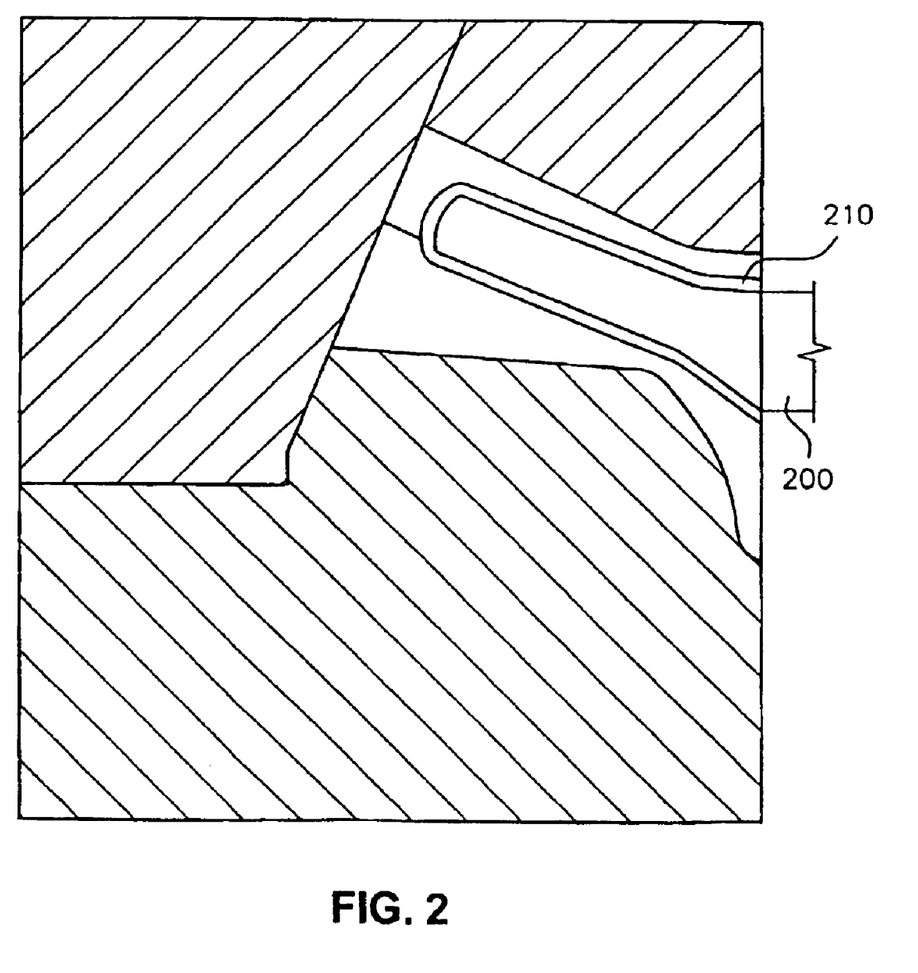
FIG. 2 is a schematic view of a blow mold which would not work with typical core rod handling apparati.

FIG. 2 shows a mold shape which would provide product bottle 100 of FIG. 1. Typically, the parison shape for a bottle of constant wall thickness has itself a constant wall thickness. Such a parison is then inserted into the geographic center (or near geographic center) of the blow mold to insure consistent wall thickness. In the case of the bottle of FIG. 1, this parison would have to be oriented approximately as shown in FIG. 2, with core rod 200 and parison 210 in place within the near geographic center of the mold. The problem with this requirement, however, is that conventional processing machinery strips the product bottle from the core rod in a direction parallel to the longitudinal axis of the core rod. Thus, the resultant blown bottle of FIG. 2 cannot be stripped from the core rod in a direction parallel to the axis of the core rod because the front part of the bottle blocks its removal. An entirely new machine for moving the core rod in an articulated fashion with respect to the bottle during the stripping step would have to be created which would cantilever the core rod with respect to the blown bottle. Moreover, a traditional machine for stripping the bottle from the core rod could not be used.

Figure 7:
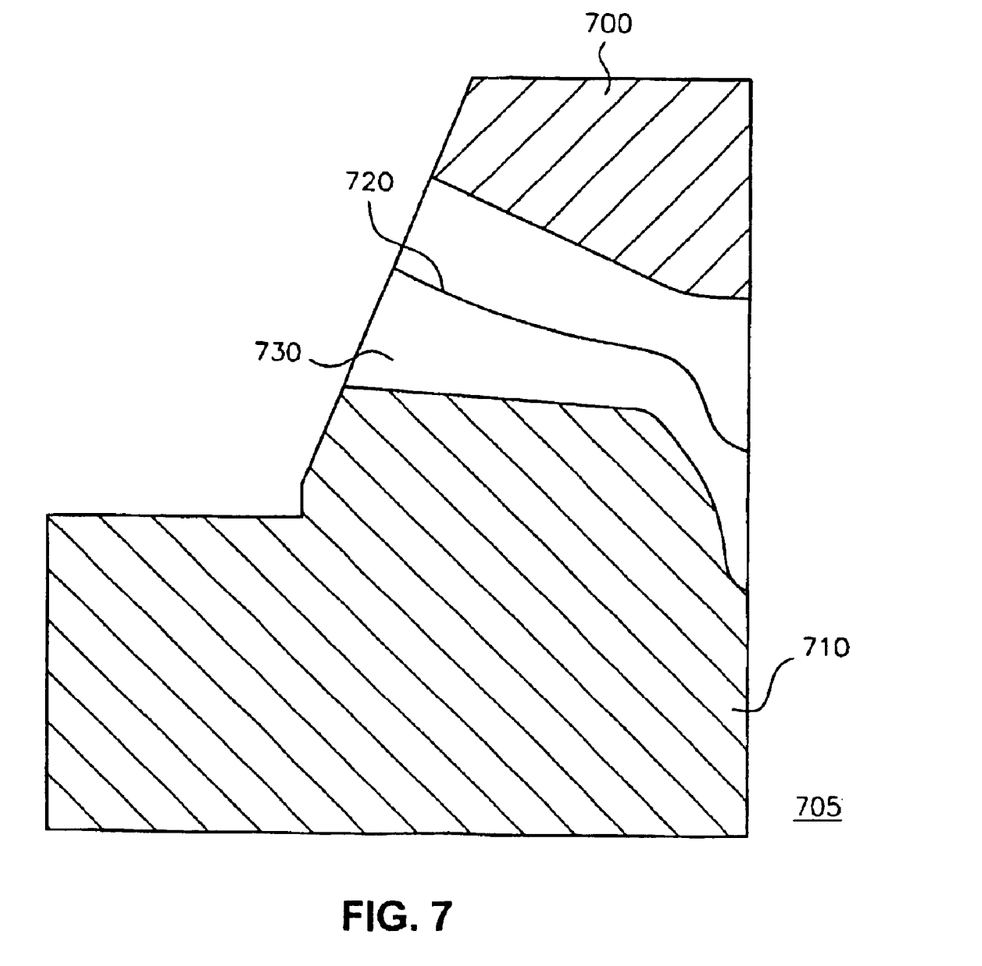
FIG. 7 is a cross-sectional sideview of a blow mold according to the present invention.

One alternative to this problem would be to orient the blow mold with respect to the core rod such that the product bottle is rotated 90° from that shown in FIG. 7. This would result, however, in the parting line (which is visible on the product bottle) being oriented on the front and back faces of the bottle, rather than on the sides. In addition to being less aesthetically pleasing, the front/back parting line makes label adhesion more difficult.

The present invention solves these problems by providing a novel method and parison. The parison used in the present invention has varying wall thickness along its different sides which overcome the need for the parison to be present in the physical middle of the blow mold. The use of this novel parison allows undercut bottles of the type shown in FIG. 1 to be blow molded, whereas in the past extrusion molding would likely have been used.

Figure 3:
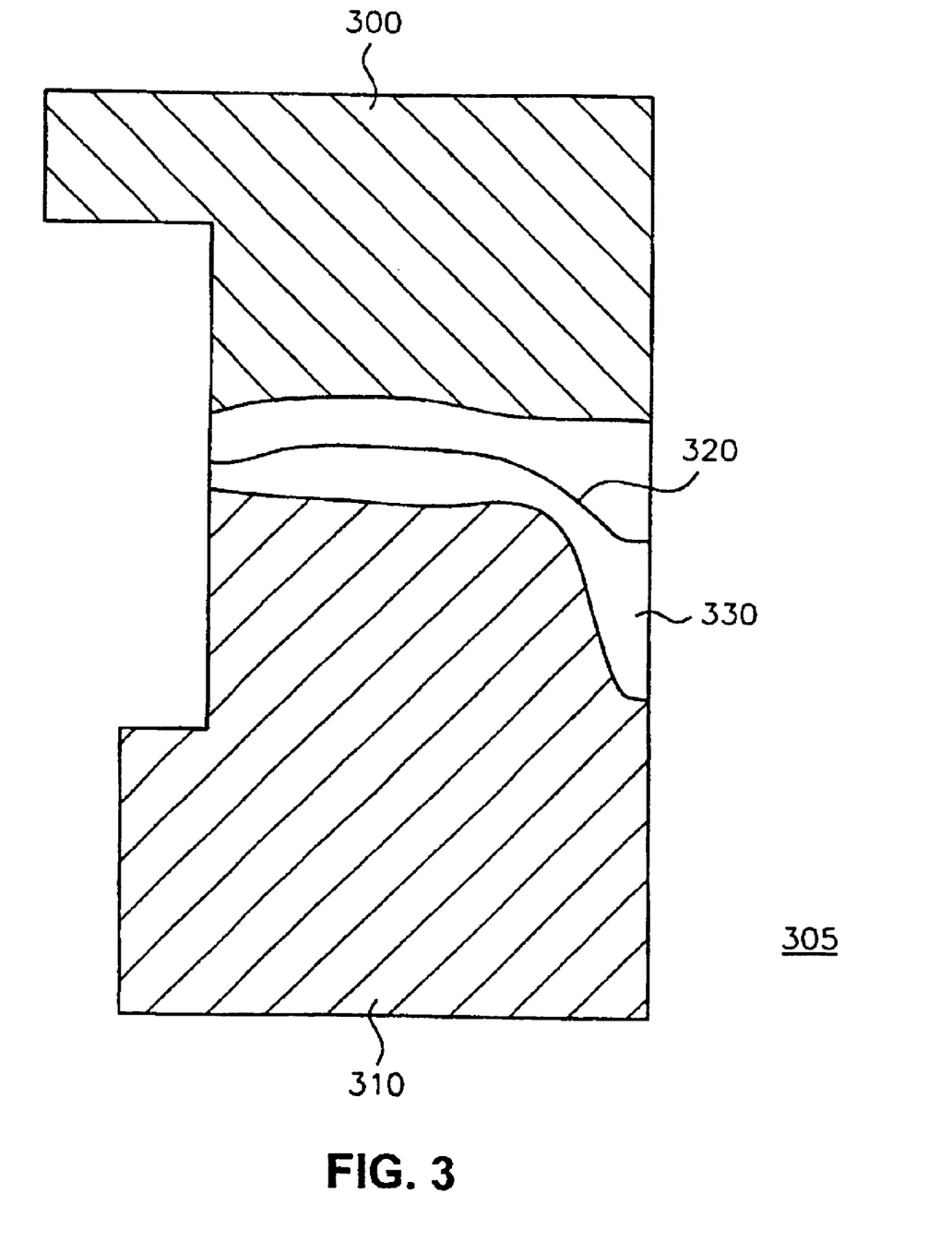
FIG. 3 is a cross-sectional sideview of a parison mold according to the present invention.
Figure 4:
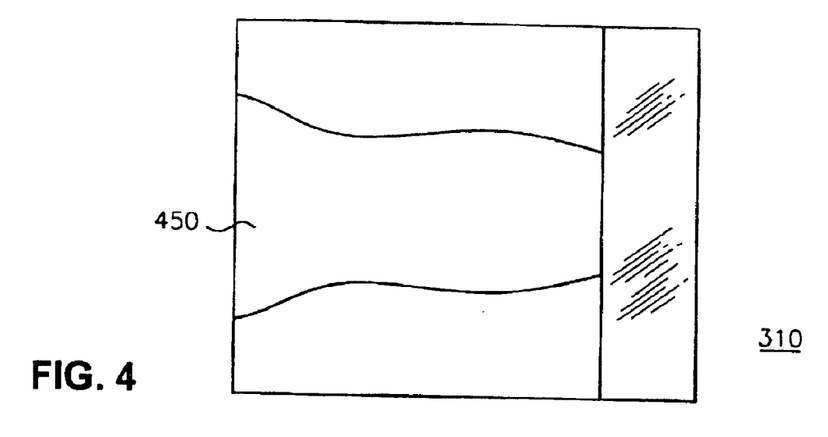
FIG. 4 is top view of the bottom half of the parison mold of FIG. 3.
Figure 4A:
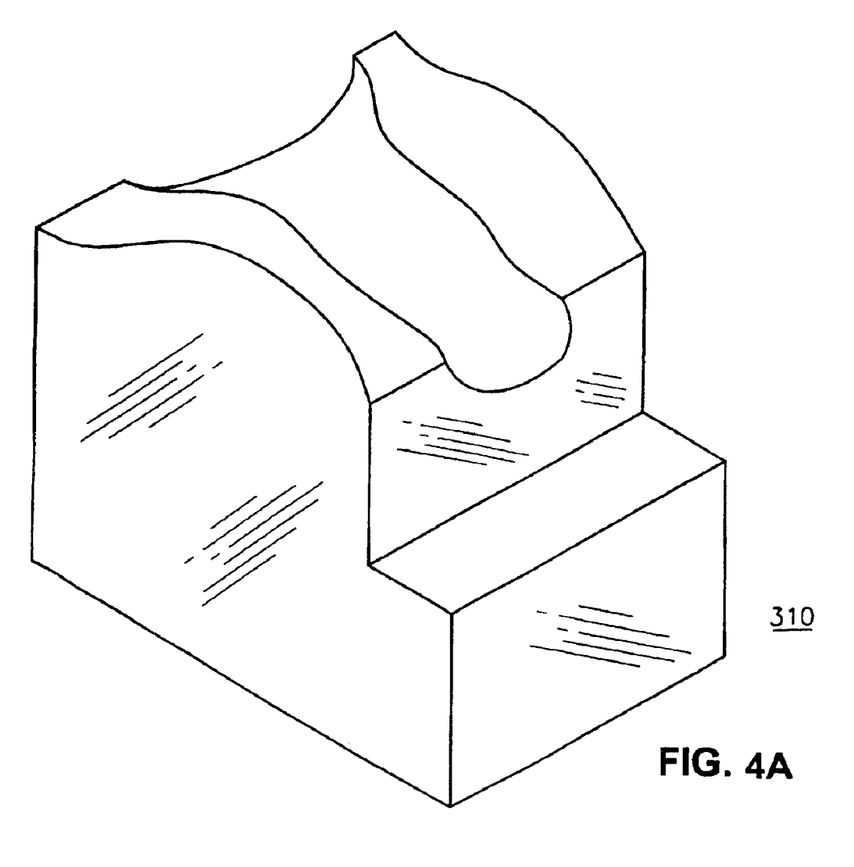
FIG. 4A shows an isometric view of a parison mold bottom half.

FIG. 3 shows a cross-sectional sideview of the parison mold according to the present invention. FIG. 3 shows parison mold 305 with parison mold top half 300 and parison mold bottom half 310 which come together along non-linear parting line 320 to form parison mold cavity 330. FIG. 4 shows a top view of parison mold bottom half 310 having cavity 450. FIG. 4A shows an isometric view of the bottom half 310.

Figure 5:
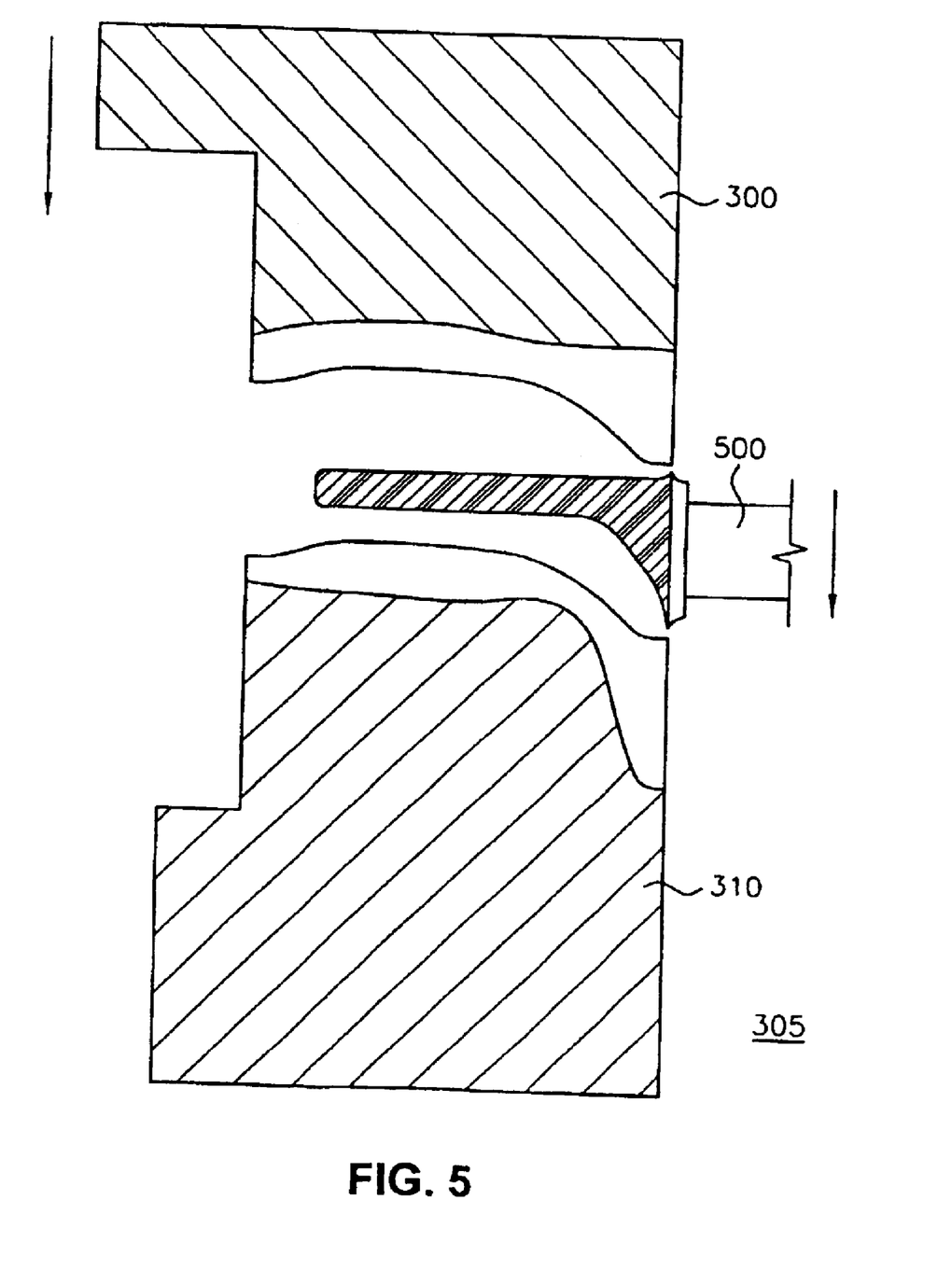
FIG. 5 is a cross-sectional sideview of the parison mold of FIG. 3 with a core rod in place.
Figure 6:
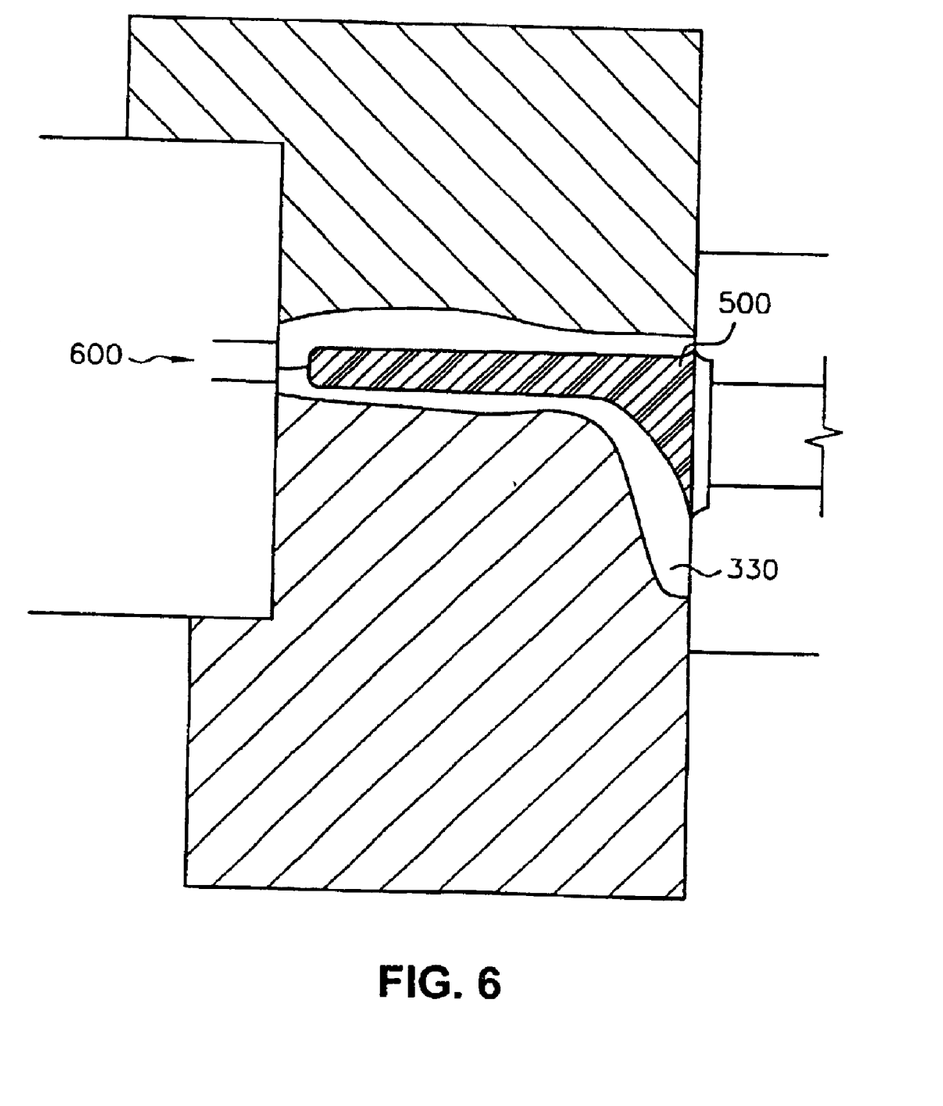
FIG. 6 is a cross-sectional sideview of the parison mold of FIG. 3 with a core rod inserted and a resin injection nozzle in place.
Figure 6A:
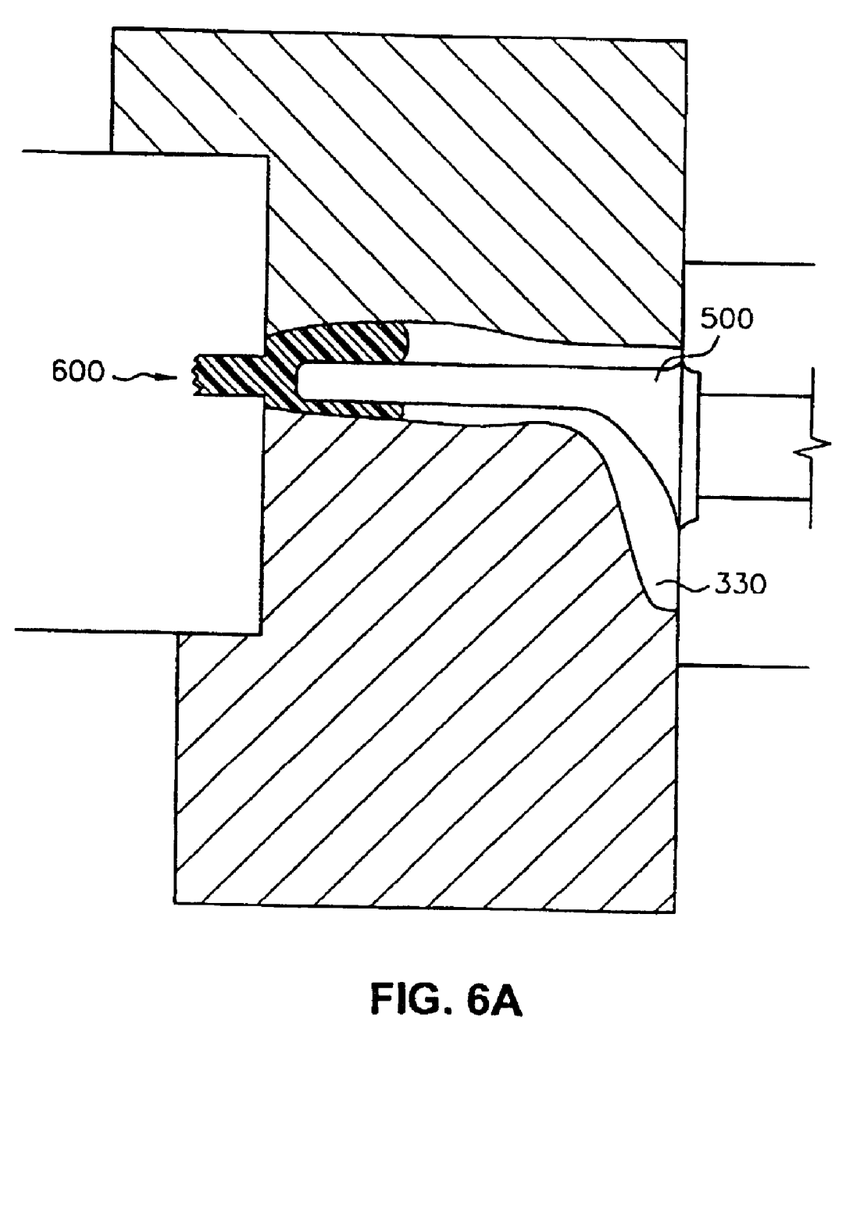
FIG. 6A is a cross-sectional sideview of the apparatus of FIG. 6 showing the injection of resin to form the parison.

FIG. 5 shows a schematic view of the cross-sectional sideview of parison mold 305 shown in FIG. 3 with core rod 500 oriented between mold halves 300 and 310. When the mold closes, both core rod 500 and top mold half 300 move toward mold half 310 as shown by the arrows in FIG. 5. Alternatively, all three components could move as the mold closes. FIG. 6 shows core rod 500 in place within parison mold cavity 330. Also shown schematically is resin injection nozzle 600 which delivers resin into parison mold cavity 330. FIG. 6A shows the space defined between core rod 500 and parison mold cavity 330 being filled with resin to form a parison. As will be discussed more fully below, core rod 500 with its partially cooled resin will be moved to the blow mold cavity.

Figure 7A:
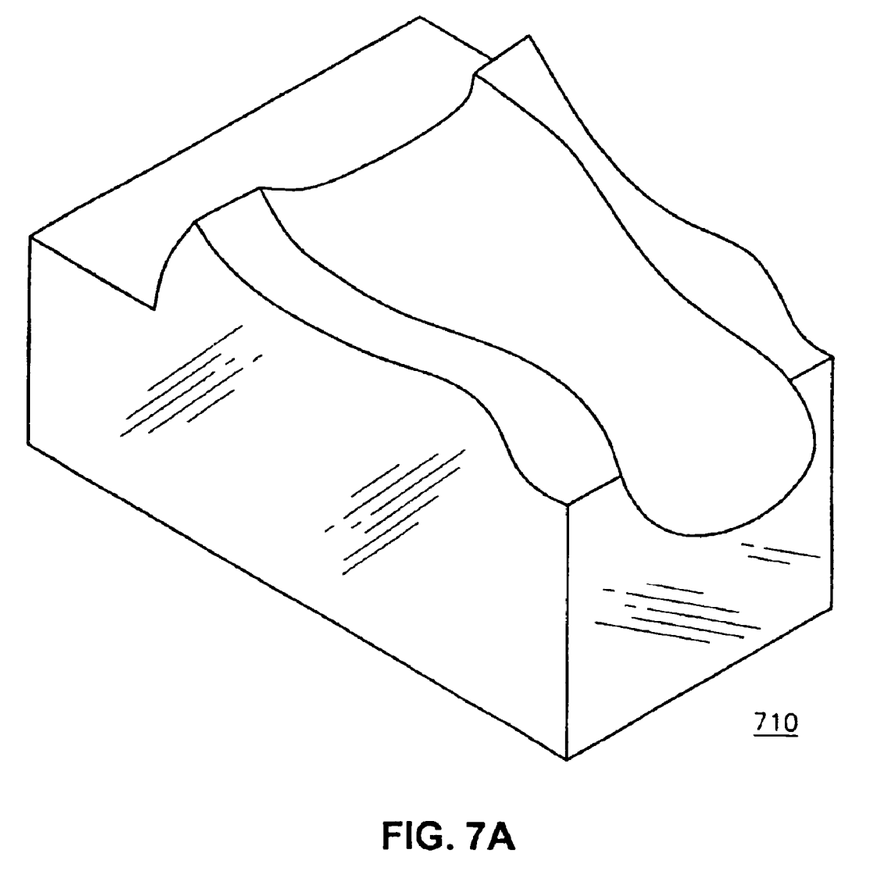
FIG. 7A shows an isometric view of a blow mold bottom half.
Figure 8:
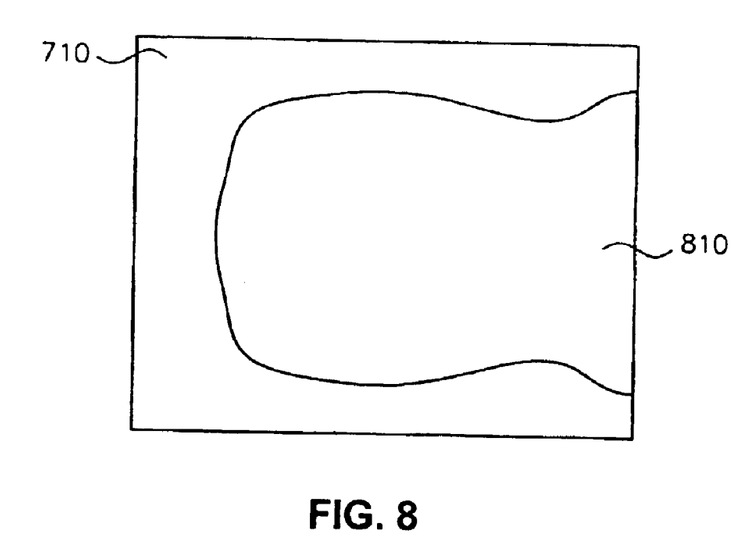
FIG. 8 is a top view of the bottom half of the blow mold of FIG. 7.
Figure 9:
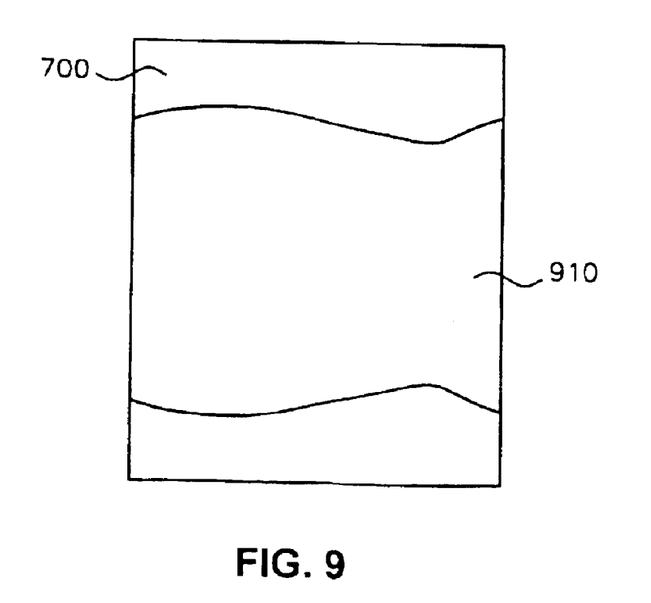
FIG. 9 is a bottom view of the top half of the blow mold of FIG. 7.

FIG. 7 shows a cross-sectional sideview of a blow mold 705 that can be used in the present invention. Blow mold top half 700 contacts blow mold bottom half 710 along blow mold parting line 720 to form blow mold cavity 730. FIG. 7A shows an isometric view of blow mold bottom half 710. FIG. 8 shows a top view of blow mold bottom half 710 having cavity 810, FIG. 9 shows a bottom view of blow mold top half 700 having cavity 910.

Figure 10:
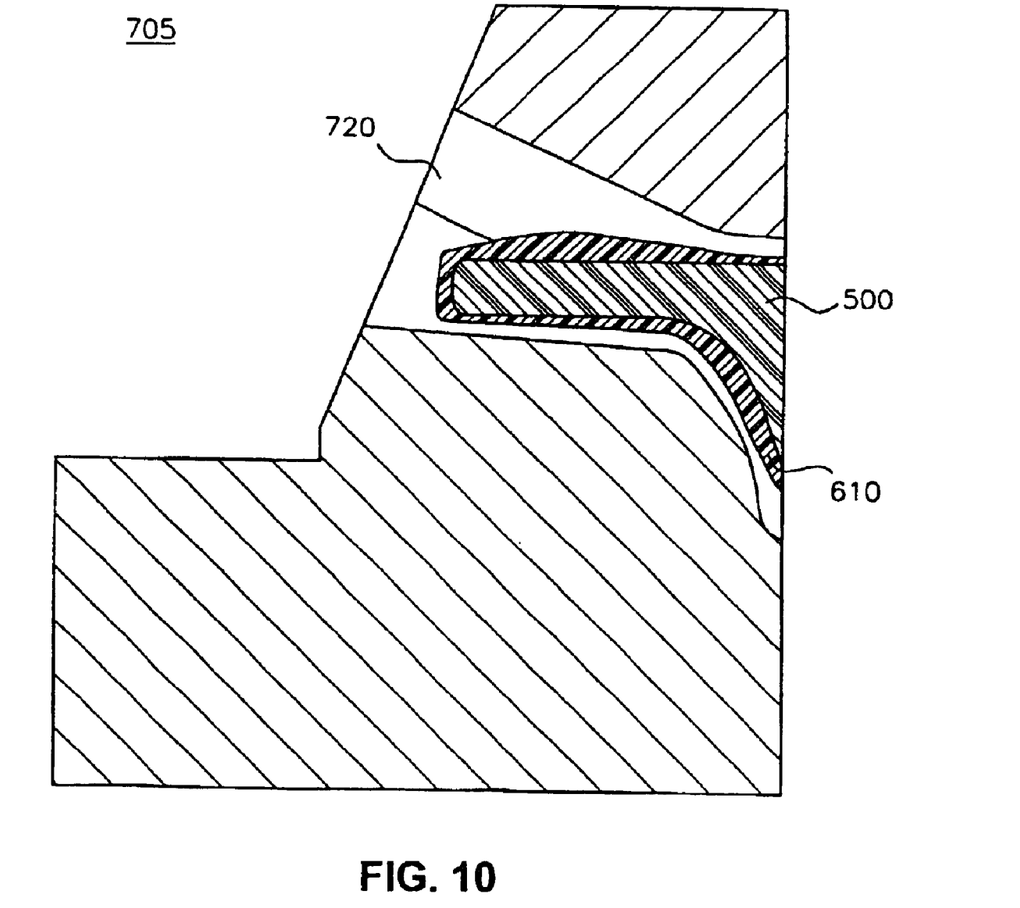
FIG. 10 is a cross-sectional sideview of the blow mold of FIG. 7 with a core rod and parison disposed therein.

FIG. 10 illustrates a schematic cross-sectional side view of blow mold 705 shown in FIG. 7, with core rod 500 and parison 610 disposed within blow mold cavity 720. In this position, the parison is ready to be blown, according to known practices, and air is injected through a small passageway within core rod 500 (not shown) which blows the parison outward against the blow mold inner wall.

Figure 11:
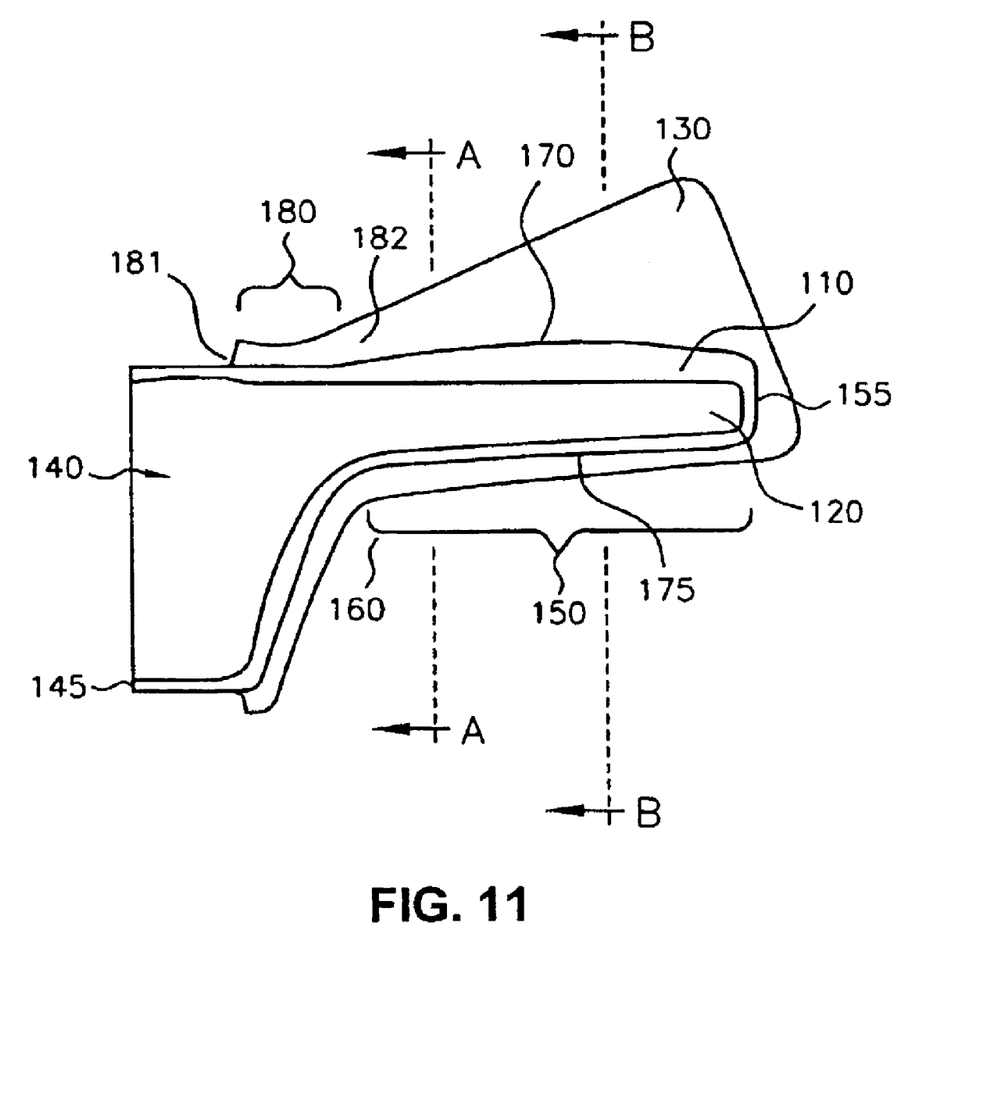
FIG. 11 is a schematic sideview of a core rod and parison disposed within a blow mold according to the present invention.

FIG. 11 shows a more detailed view of a parison 110 disposed on core rod 120. This embodiment is slightly different than those shown in the above figures, but is consistent with the present invention. Specifically, parison 110 comprises a cylindrical upper neck portion 140 having a cavity extending therethrough. Upper neck portion 140 has a top surface edge 145 defining a top plane, a hollow, elongated lower body portion 150 having a closed lower end 155 and an upper end 160. Lower body portion 150 has a major axis extending in a direction parallel to the longitudinal axis of the cylindrical to upper neck portion 140, and has a front wall 170 and a rear wall 175. Closed lower end 155 defines a plane which is parallel to the top plane defined by the top surface edge 145. Also shown in FIG. 11 is a transition region 180 connecting upper neck portion 140 and lower body portion 150. Transition region 180 has a top end 181 with the same cross section as the cylindrical upper neck portion 140 and a lower end 182 with the same cross section as the upper end 160 of lower body portion 150. Transition region 180 has a sloped wall extending from rear wall 175 of lower body portion 150 out and up from rear wall 175 to upper neck portion 140.

Figure 11A:
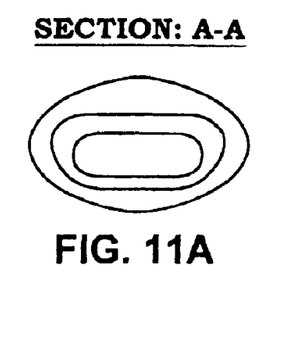
FIGS. 11A and 11B are sections taken from FIG. 11.
Figure 11B:
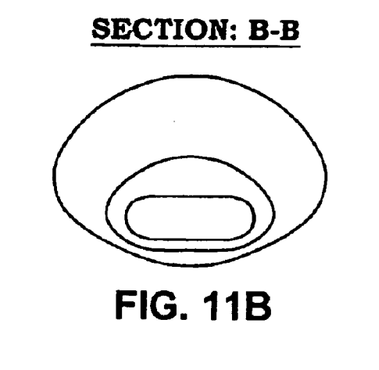

As can be seen in FIG. 11, front wall 170 is thicker than the rear wall 175. Sections A—A and B—B are shown in FIGS. 11A and 11B, respectively. FIG. 11A shows a cross-section of lower body portion 150 near upper end 160. FIG. 11B shows a cross-section of lower body portion 150 toward the closed lower end 155. FIG. 11A shows the cross-section where the distance from the parison to the blow mold wall is approximately the same on either side of the parison. In contrast, FIG. 11B shows the cross-section where the distance from the parison to the blow mold wall is much greater on front wall 170 of the parison than on rear wall 175. Where the distance is greater, the thickness of the parison itself is also greater.

This change in parison wall thickness is dependent upon the distance the parison wall material must travel when blown. In those areas along the parison wall where little stretching will occur, there exists no need to supply extra material. On the other hand, in those areas along the parison wall where a relatively large amount of stretching will occur, additional material is needed.

Figure 12A:
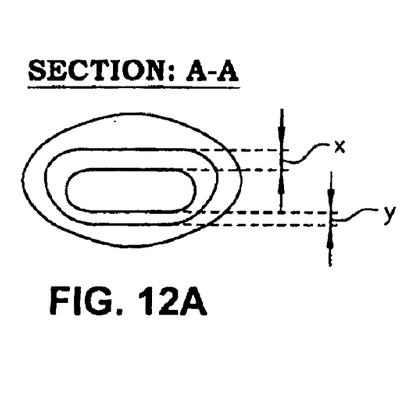
FIGS. 12A and 12B are the sections of FIGS. 11A and 11B, respectively, with dimensions indicated thereon.
Figure 12B:
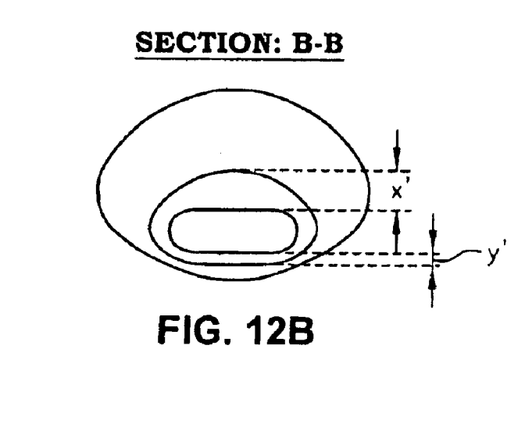

FIGS. 12A and 12B illustrate a preferred embodiment of the parison shown in FIG. 11. In FIG. 12A, x=about 0.08 inches ("about" meaning +/−0.01 inches, in all cases herein unless otherwise noted), and y=about 0.07 inches. In FIG. 12B, x'=about 0.17 inches, and y'=about 0.07 inches.

Also illustrated in FIGS. 11 and 12 is the fact that along front wall 170 of the parison the wall thickness is tapered from closed lower end 155 having a first thickness up to a thickest central portion and down to a second thickness at the transition region. At the lower end of transition region 182 at front wall 170, the parison wall thickness is about equal to the parison wall thickness at the upper end 160 of lower body portion 150. This is because the distance that the material comprising the parison at that point must travel during blowing is about the same.

This parison also relates to a novel method of blow molding a container having an undercut shape. More specifically, the method according to the present invention provides a bottle having an undercut shape having a substantially constant wall thickness. The bottle also has a base, a round top edge defining a round opening, the round top edge defining a plane which is not parallel to the plane of the base, a neck portion disposed at the same angle as the plane defined by the top edge, a front outer surface, and a rear outer surface having a lower portion and an upper portion. The method used to blow mold such a bottle comprises the steps of first forming a particular parison, as discussed above, and then blowing the parison in a blow mold. The parison has a first wall which is a first distance from the blow mold inner surface and a second wall which is a second distance from the inner surface of the blow mold. The first distance is less than the second distance and the first wall is thinner over most of its length than the second wall.

More specifically, the method uses a parison where the front wall is about 2.5 times thicker at its thickest point than the rear wall. This aspect of the invention is important as the material along the front wall must travel much farther during blowing, and thus is stretched to a much greater extent, than the material comprising the rear wall of the parison.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed:

1. A method of blow molding a container having substantially constant wall thickness and an outside shape with a non-linear parting line, the method comprising the steps of:

placing a parison into a blow mold having an inner surface which is the shape of the outside of said container being molded, said parison having a first wall a first distance from said blow mold inner surface and a second wall a second distance from said inner surface wherein said first distance is less than said second distance and said first wall is thinner than said second wall; and blowing said parison in said blow mold, without first stretching said second wall, into said container.

2. The method of claim 1 wherein said parison has:

a cylindrical upper neck portion having a cavity extending therethrough, said upper neck having a top surface edge defining a top plane;

a hollow, elongated lower body portion having a closed lower end and an upper end, said lower body portion having a major axis extending in a direction parallel to the longitudinal axis of said cylindrical upper neck portion, and having a front wall and a rear wall, said closed lower end defining a plane which is parallel to said top plane defined by said top surface edge; and a transition region connecting said upper neck portion and said lower body portion, said transition region having a top end with the same cross section as said cylindrical upper neck portion and a lower end with the same cross section as said upper end of said lower body portion, said transition region having a sloped wall extending from the rear wall of said lower body portion out and up from said rear wall of said lower body portion to said upper neck portion.

3. The method of claim 2 wherein said sloped wall is thicker than said rear wall.

4. The method of claim 1 wherein said front wall is about 2.5 times as thick as said rear wall.

5. The method of claim 2 wherein said front wall thickness is tapered from said closed lower end having a first thickness up to a thickest central portion and down to a second thickness at said transition region wherein said first thickness and said second thickness are about equal.

6. The method of claim 2 wherein said sloped wall is tapered from the rear wall of said lower body portion having a first thickness up to a thickest central portion of said sloped wall and down to a second thickness at said cylindrical upper neck portion.

7. A parison for a container having substantially constant wall thickness, said container having a base, a top edge defining a round opening, the top edge defining a plane which is not parallel to the plane of the base, a neck portion disposed at the same angle as the plane defined by the top edge, a front outer surface, and a rear outer surface having a lower portion and an upper portion, the parison comprising:

a cylindrical upper neck portion having a cavity extending therethrough, said upper neck having a top surface edge defining a top plane;

a hollow, elongated body portion having a closed lower end and an upper end, said lower body portion having a major axis extending in a direction parallel to the longitudinal axis of said cylindrical upper neck portion, and having a front wall opposite a and rear wall;

wherein said front wall is thicker than said rear wall.

8. The parison of claim 7 wherein said front wall is about 2.5 times as thick as said rear wall.

9. The parison of claim 7 wherein said front wall thickness is tapered from said closed lower end having a first thickness up to a thickest central portion and down to a second thickness at said transition region wherein said first thickness and said second thickness are about equal.

10. A parison for a container having substantially constant wall thickness, said container having an oblong base, a round top edge defining a round opening, the round top edge defining a plane which is not parallel to the plane of the base, a neck portion disposed at the same angle as the plane defined by the top edge, a front outer surface, and a rear outer surface having a lower portion and an upper portion, the parison comprising:

a cylindrical upper neck portion having a cavity extending therethrough, said upper neck having a top surface edge defining a top plane;

a hollow, elongated lower body portion having a closed lower end and an upper end, said lower body portion having a major axis extending in a direction parallel to the longitudinal axis of said cylindrical upper neck portion, and having a front wall opposite a rear wall, said closed lower end defining a plane which is parallel to said top plane defined by said top surface edge; and a transition region connecting said upper neck portion and said lower body portion, said transition region having a top end with the same cross section as said cylindrical upper neck portion and a lower end with the same cross section as said upper end of said lower body portion, said transition region having a sloped wall extending from the rear wall of said lower body portion out and up from said rear wall of said lower body portion to said upper neck portion;

wherein said front wall is thicker than said rear wall.

11. The parison of claim 10 wherein said sloped wall is thicker than said rear wall.

12. The parison of claim 1 wherein said front wall is about 2.5 times as thick as said rear wall.

13. The parison of claim 10 wherein said front wall thickness is tapered from said closed lower end having a first thickness up to a thickest central portion and down to a second thickness at said transition region wherein said first thickness and said second thickness are about equal.

14. The parison of claim 10 wherein said sloped wall has a thickness greater than said rear wall.

15. The parison of claim 10 wherein said sloped wall is tapered from the rear wall of said lower body portion having a first thickness up to a thickest central portion of said sloped wall and down to a second thickness at said cylindrical upper neck portion.

* * * * *